Patented May 10, 1927.

1,628,171

UNITED STATES PATENT OFFICE.

ABE McINTYRE, OF BILLINGS, MONTANA.

FIREPROOF COMPOSITION.

No Drawing. Application filed February 15, 1926. Serial No. 88,461.

This invention relates to fire-proofing compositions and has for its object the provision of a cement adapted for forming fireproof walls or coating or for forming a fluid of such consistency that it may be sprayed upon materials to prevent combustion of the materials or which may be sprayed upon burning materials to prevent the spread of conflagration of the same. In this connection it may be stated that when used as a spray the solution will be employed for application to burning brush and trees to not only stop the combustion but to prevent spreading of the conflagration.

A further object of the invention is the provision of a composition in which lye is employed in connection with flour so that when the fire-proofing materials are mixed therewith a product will be had which will be translucent and have a highly polished or glossy surface.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

In carrying out my invention I propose to form a fire-proof composition which is either in the form of a paste for application to surfaces to form a coating or in the form of a cement which may be applied to buildings or articles for forming a fire resistant coating. It is also intended that the composition be employed as a solution and of such a consistency that it may be sprayed by the usual apparatus onto fires for not only extinguishing the fires but for preventing spreading of the conflagration.

It has been proposed to employ various types of binders such as glue for fire resistant materials. However, glue and such binders are expensive and they are objectionable in many other respects due to the fact that the glue or binders are affected by the elements of the weather which causes crumbling of the coating.

The following ingredients are employed in the following approximate proportions— 1 pound of flour, 20 pounds of asbestos, ½ ounce of lye, 2 ounces of salt. Any suitable pigment may be employed as is well known and the quantity of the pigment is determined by the intensity of the color desired.

In carrying out the process for producing the fire-proofing composition I first form a thin paste of the flour with warm water. ½ ounce of lye is added to approximately 12 quarts of water and when the lye has been thoroughly dissolved the lye water is then slowly added to the thin flour paste and thoroughly stirred until a homogeneous solution is had. This solution is then boiled and after cooling the salt and asbestos are added and the ingredients are thoroughly incorporated by any well known means.

The solution of the asbestos, flour, lye and salt is then dried and either formed into cakes or blocks of any desired size and kind. The water may be evaporated either by sun baths or by vacuum tanks. The dried materials are then pulverized and are ready for shipment. Before the fire-proof coating is to be applied either to articles or to buildings sufficient water is added to form a paste or cement. When the fire-proofing composition is adapted to be employed for the prevention of fires and conflagrations sufficient water is added to form a solution for spraying purposes.

When the lye is added to the wheat flour a chemical change takes place so that when the asbestos is added and the complete product has been applied to the wall the coating will have a highly polished or glossy surface and will be somewhat translucent.

By the use of the lye in the solution with the flour and asbestos the volume of the product is greatly increased so that a greater area of articles may be covered when the product is employed as a paste or cement than otherwise may be done when other binders are employed.

What I claim is:

1. A fire-proof composition comprising a reaction product formed from a mixture of 1 pound of flour, 20 pounds of asbestos, ½ ounce of lye and 2 ounces of salt.

2. A fire-proof composition comprising a reaction product formed from a mixture of asbestos, flour, lye, and salt the flour being affected by the chemical action of the lye.

3. A process for producing a fire-proof composition and comprising forming a thin paste of flour, dissolving lye in water, stirring the solution of lye into the flour paste, and then adding asbestos and salt.

4. A process for producing a fire-proof composition and comprising forming a thin paste of flour, dissolving lye in water, stirring the solution of lye into the flour paste, and then adding asbestos and salt, evaporating the moisture from the ingredients and pulverizing the residue.

5. A process for producing a fire-proof composition which comprises forming a thin paste of one pound of flour and warm water, dissolving one-half ounce of lye in twelve quarts of water, stirring the solution of the lye into the flour paste, boiling the solution of lye and flour, and then adding twenty pounds of asbestos and two pounds of salt.

6. A process for producing a fire-proof composition which comprises forming a thin paste of one pound of flour and warm water, dissolving one-half ounce of lye in twelve quarts of water, stirring the solution of the lye into the flour paste, boiling the solution of lye and flour, and then adding twenty pounds of asbestos and two pounds of salt, thoroughly stirring the asbestos and salt into the solution of lye and flour, evaporating the water, and then pulverizing the residue.

ABE McINTYRE.